Jan. 10, 1933. L. G. JAMES ET AL 1,893,672
MACHINE FOR PRODUCING CANDY CONFECTION
Original Filed Dec. 2, 1929  3 Sheets-Sheet 3
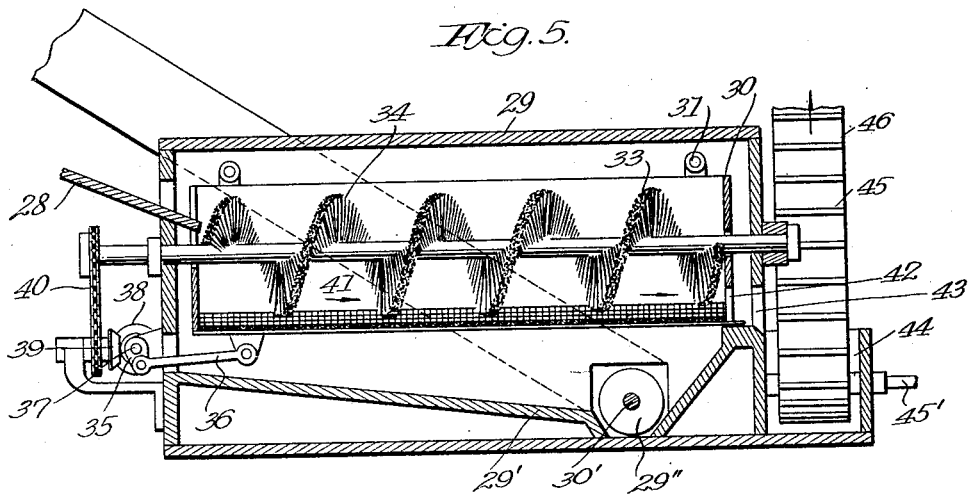
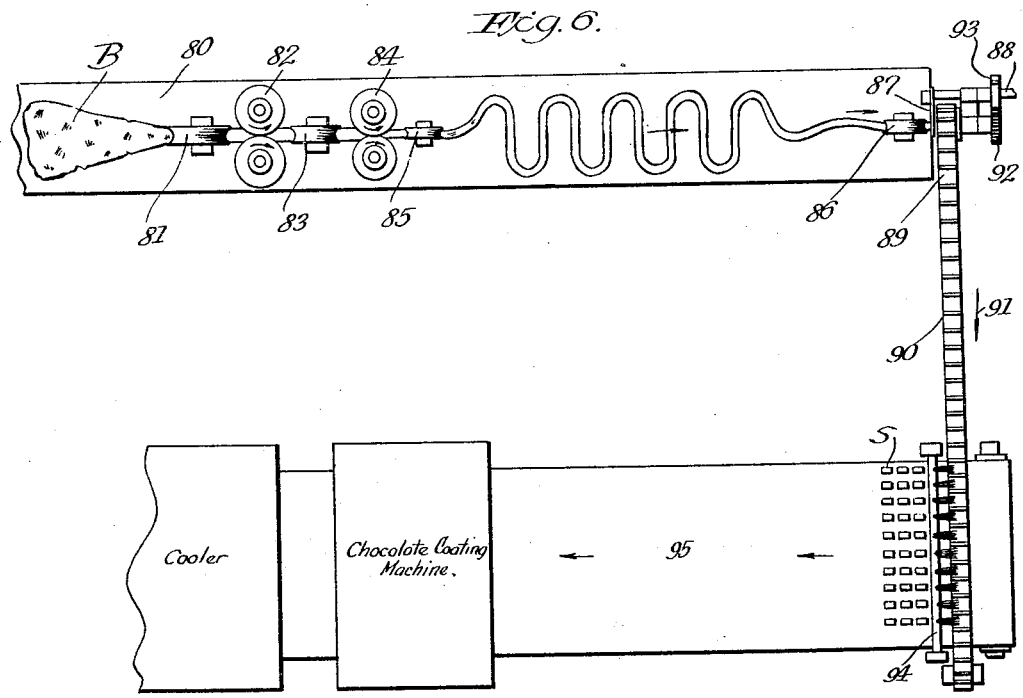
Inventors
Lee G. James.
Harry E. James.
Enoch R. James.

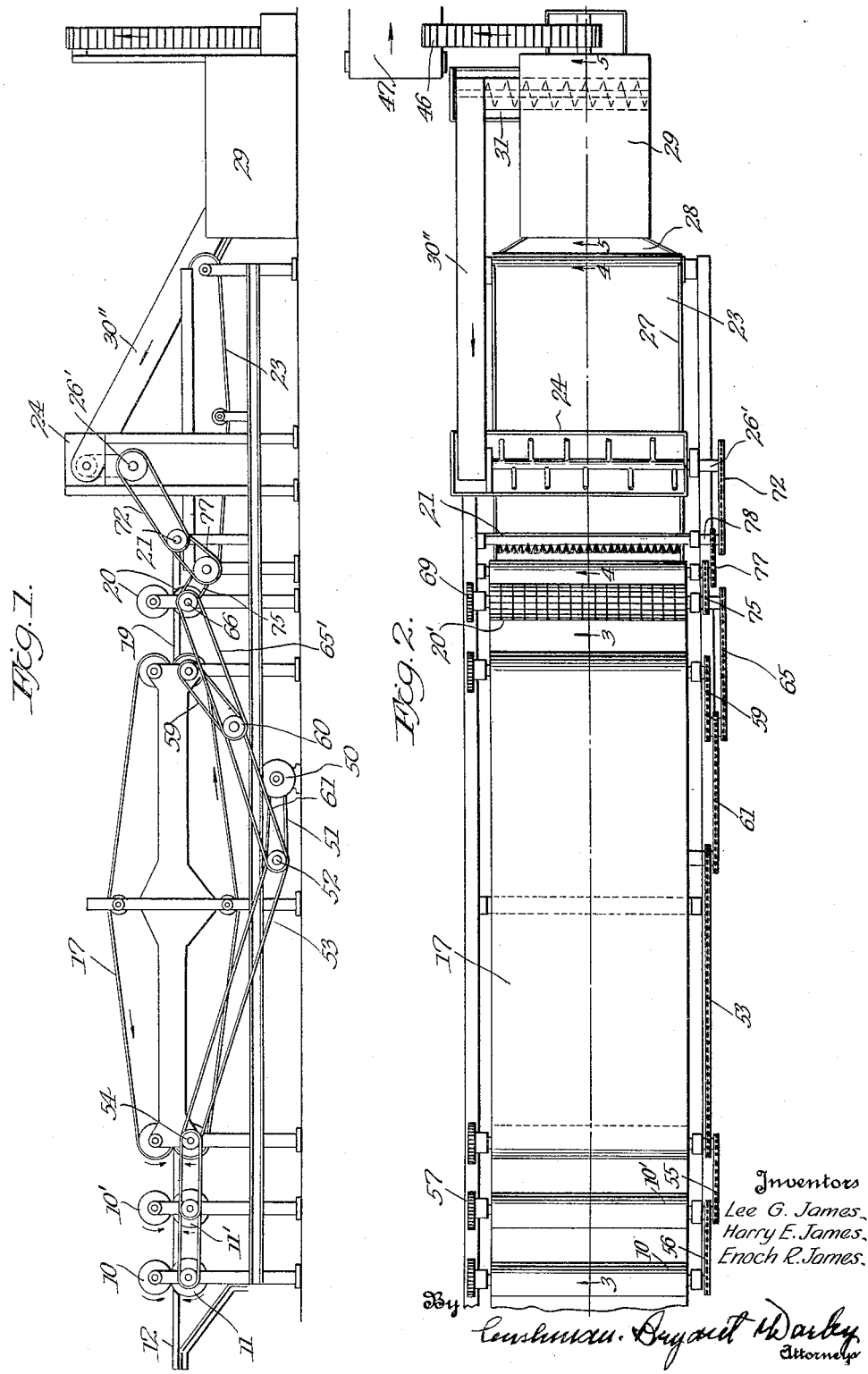

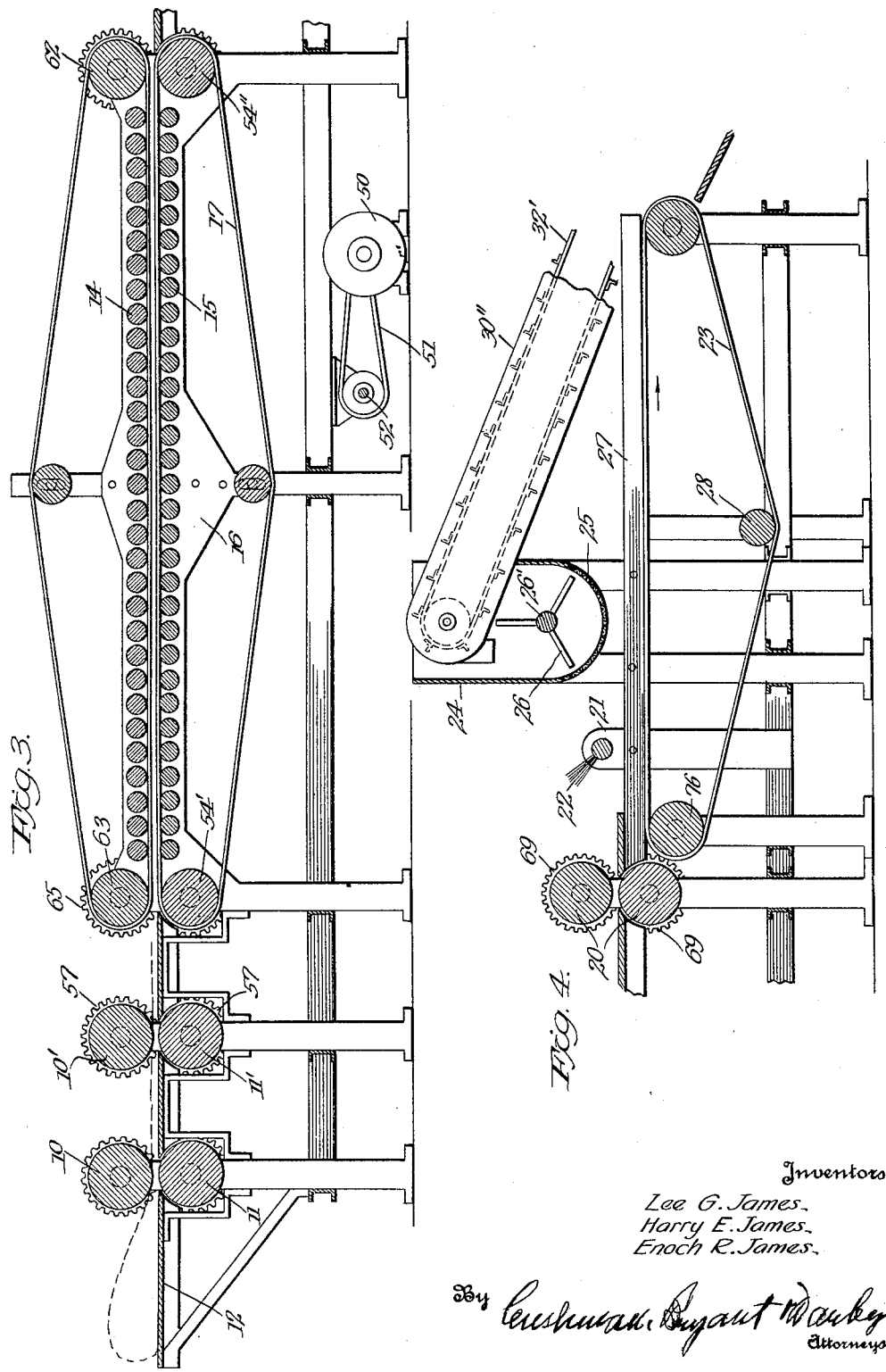

Patented Jan. 10, 1933

1,893,672

UNITED STATES PATENT OFFICE

LEE G. JAMES, HARRY E. JAMES AND ENOCH R. JAMES, OF ATLANTIC CITY, NEW JERSEY

MACHINE FOR PRODUCING CANDY CONFECTION

Original application filed December 2, 1929, Serial No. 411,086. Divided and this application filed February 8, 1930. Serial No. 427,012.

This invention relates to a machine for the manufacture of taffy, particularly "salt water taffy".

This application is a division of our co-pending application, Patent No. 1,747,116, dated February 11, 1930.

"Salt water taffy" is a generally recognized name for a type of taffy ordinarily manufactured and sold at seashore resorts. Its essential ingredients are (1) corn syrup, (2) sugar, ground or granulated, and (3) butter, either cream or cocoanut, or a butter substitute.

The corn syrup and sugar are usually employed in proportions of approximately two parts of corn syrup to one part of sugar, by weight, although this proportion may be varied considerably. The mixture including the butter, which may be used in proportion of one part thereof to five parts of sugar by weight, are cooked to a temperature of somewhat over 240° F., and thereafter the heated mixture is removed and cooled. The cooling step produces a relatively firm taffy batch which may be worked. The batch is then worked or aerated by beating, whipping or pulling, and this operation is ordinarily performed on a machine of the type disclosed in the patent to Thibodeau, 736,313, granted August 11, 1903, although other machines which will perform the pulling operation have been utilized.

During the course of the beating operation, it is customary to introduce a flavoring, and different flavors are used in different batches. Following this step the batch is introduced into a cutting and wrapping machine, which includes forming means, such as rollers, adapted to compress the batch as it is fed into the machine to a tenuous or string-like form, which is cut off into pieces of approximately an inch in length and automatically wrapped in paper immediately following the cutting operation.

For the purpose of making clearer the usual method of manufacturing candy of this type, we will explain somewhat in detail a preferred method which has been used by us, although it will be understood that the example embodies certain ingredients and steps which are not essential to the candy in order to produce what would be recognized as candy of the salt water taffy type.

In our practice, a batch is prepared from a mixture of the following ingredients in substantially the proportions indicated:

| Corn syrup | 120 pounds |
| Sugar (granulated) | 50 pounds |
| Sugar (invert) | 14 pounds |
| Cocoanut butter | 12 pounds |
| Gum arabic | 7 ounces |

The batch, as above prepared, is slowly heated in a suitable kettle to approximately 253° F. and during the cooking is stirred sufficiently to obtain a proper mixture and smooth final batch.

The cocoanut butter is found preferable to ordinary butter, since it will not turn rancid. We attach particular value to the use of the gum arabic which is thought to be novel in the manufacture of candy of this type. It has been found to be an excellent emulsifying agent for the butter and produces a smooth final product.

After the mixture reaches the specified temperature (253° F.), caramel cream is introduced. Caramel cream is a commercial mixture consisting of corn syrup, sugar and condensed milk, and may be procured in the trade under this name. Approximately ten (10) pounds of caramel cream in a batch having the ingredients specified in the proportions mentioned, will be found suitable. The introduction of the caramel cream cools the mixture, and it is thereafter heated to 252° F., whereupon the batch is removed from the cooking kettle to a cooling table where it is allowed to cool and harden. After hardening, the flat batch is rolled to a relatively bulky mass and then subjected to a whipping, beating or pulling operation which serves to aerate or puff the same. This operation is performed upon a machine of the type disclosed in the Thibodeau Patent No. 736,313, above mentioned, and ordinarily consumes approximately five minutes; the pulling makes the taffy tender, aerates the batch, and reduces stickiness. Following the operation, during the course of which the desired flavoring is introduced, the batch is ready to be formed and cut into individual pieces and to be wrapped. The forming, cutting and wrapping is usually performed on automatic machinery. The batch is drawn out into a tenuous string-like body of circular cross section and of approximately an inch in diameter, and fed between the forming rolls of a cutting and wrapping machine which compress the same to the diameter desired for the individual piece. From the forming rolls, the mass is automatically fed to the cutting instrumentality, and each piece is wrapped tightly in suitable material such as paraffin paper, almost immediately after it has been cut.

The present invention relates to a candy confection of this salt water taffy type, and by "candy of the salt water taffy type" as this designation is used throughout the specification and claims, is meant a candy having as its essential ingredients corn syrup, sugar and butter or a butter substitute, these ingredients being cooked, then hardened, and thereafter aerated by beating, whipping or pulling operation.

The invention also comprehends a machine for carrying out the improved method of manufacture, and among the objects of the invention, in so far as it relates to the machine, are: to provide a machine which will compress a relatively bulky mass into a relatively thin elongated body, to retain the body in elongated thinned condition against transverse expansion until it receives a set; and to provide means which will control, and also preferably minimize, longitudinal shrinkage after the batch has been cut into individual pieces.

The invention relates to salt water taffy having an edible coating preferably of candy-like material such as an icing or chocolate. A difficulty inherent in the production of such a product, however, has been that it is not possible to wrap the individual pieces immediately following the forming and cutting of the batch into individual pieces. A period of time is required, of course, for the formation of the coating which is applied after the cutting operation, and furthermore, some time must be permitted to elapse before wrapping, in order that the coating may harden. Therefore, it is not possible, as in the manufacture of ordinary salt water taffy, to wrap the candy almost instantaneously after it has been cut.

The invention seeks to provide a method of manufacture which will afford a coated salt water taffy, the pieces of which are of uniform dimensions and the centers of which will not shrink after the application of the coating thereto. Heretofore, it has been a simple matter to obtain pieces of uniform dimensions and to avoid shrinking, for the reason that the candy is wrapped tightly immediately after its cut, and the instantaneous wrapping prevents shrinking and distortion of the piece. Moreover, shrinkage is not so objectionable in non-coated salt water taffy, since there is no coating to be cracked or broken down when the taffy shrinks, and, therefore, the product is not unsightly.

The invention contemplates, therefore, the manufacture of the candy in such a way that the final coated product will consist of pieces, the dimensions of which are regular and uniform, and the centers of which will not shrink and cause the coating to break down. It will be understood, of course, that this phase of the invention has to do primarily with that type of coating which will break down or crack upon variation in the form or dimensions of the center, by reason of the fact that it is relatively hard and cannot conform to variations in the form or dimensions of the center. Chocolate provides such a coating when it is applied to the center and then hardened.

We have found that pieces of predetermined dimensions or pieces of uniform dimensions may be produced by controlling the longitudinal shrinkage which develops in the cutting operation. This should be done in such a way that any cross sectional puffing or enlargement which results from the longitudinal shrinkage is always in the same plane, e. g., either horizontal or vertical. Moreover, a suitable period of time may be allowed to elapse after the cutting and before the application of the coating in which substantially all shrinkage and transverse puffing or enlargement may be completed. It will be understood, of course, that the nature of the enlargement is preferably governed or controlled during this step. In this way, there is obtained a center prepared for coating which will not shrink longitudinally or change its cross sectional dimensions after the application of the coating thereto, and hence not break down the coating. This type of treatment may be termed broadly an aging of the center before formation of the coating thereon. Such an aging treatment, although directly contrary to former practice which involves the wrapping with paper almost instantly after the coating, has been found to produce a center which does not deteriorate, providing the aging does not substantially exceed a period of time sufficient to permit the center or material to assume final and substantially permanent dimensions. It has been found that too long an exposure would produce an objectionably deteriorated center material or piece.

Another mode of processing the piece before the coating is applied and which is the preferred procedure, involves applying to surfaces of the piece, a material which will resist and minimize shrinkage and the consequent puffing or distortion of the piece from the shape imparted to it during the forming and cutting operation. This material is applied particularly to the green or cut surfaces, and it has been found desirable to treat all surfaces.

The treating agent found most suitable for this purpose has been of pulverulent character so as to serve as a filler for the cells; we prefer a vegetable pulverulent material, such as corn starch or flour. These are applied in dry form and after remaining upon the pieces for a sufficient time to coat thoroughly all surfaces, any excess thereof may be removed, as by brushing, to leave clean comparatively smooth surfaces on the cut pieces.

It has been found that when the cut pieces are coated in this manner, there will be little or no longitudinal shrinkage and cross sectional distortion, particularly if the material, preferably before being cut, is held in its formed condition for a considerable period so as to receive a set. In other words, the batch, which is initially relatively bulky, is compressed to approximately the cross-sectional form in which it is cut, and held in this compressed form for a period of time, instead of being almost instantaneously released from the forming means as has heretofore been customary. As will be understood, in former practice the material simply passes through forming rolls which compress and almost instantaneously release the material. The present invention contemplates the maintenance of an instrumentality against the surfaces of the taffy after it has been formed for a sufficient time to permit the candy to receive a set in its compressed elongated form, thereby resisting any transverse expansion or distortion which would otherwise take place. This treatment may be applied to the formed batch in bulk, and also to the individual pieces after they are cut.

Broadly, therefore, the method contemplates a processing of the taffy before the coating, so as to produce center pieces which are uniform in shape and dimensions and which will not shrink or tend to become distorted after application of the coating.

The process involves a control or regulation of the shrinkage, and this control may be exercised either (a) by an aging, or (b) by an aging accompanied by regulation or control of shrinkage with mechanical means, or (c) by applying a shrinkage resistant material, such as corn starch, and this last mentioned treatment may be accompanied by mechanical means which resists transverse expansion incident to any longitudinal shrinkage which may develop.

It will be noted, of course, that the processing involves aging in all of the various forms, for the reason that the application of the shrinkage resistant agent requires an elapse of a certain period of time. Moreover, it will be understood that all of the forms and various steps involve the use of some means, whether mechanical or a treating agent, for governing or controlling shrinkage.

When the material is processed in this manner, and thereafter has applied thereto an edible candy-like coating of material, such as icing or chocolate, there will be afforded a firm, hard piece of chewy character such as ordinary salt water taffy, and having a flavoring in both the center and the coating, the coating flavor ordinarily contrasting with the center flavor. Obviously, the centers may be made in various flavors, as the salt water taffy heretofore manufactured, and also the coating may be made in the same or different flavors, so as to contrast with the flavor of the center.

The above described and other features of the invention will become clearer as the invention is described in connection with a preferred machine for carrying out the method and producing the product. Certain embodiments of the invention insofar as it relates to an apparatus are disclosed in the accompanying drawings, wherein:

Figure 1 is a side elevational view.
Figure 2 is a top plan.
Figures 3 and 4 are fragmentary longitudinal sections on the lines 3—3 and 4—4 of Figure 2.
Figure 5 is a longitudinal sectional view of the cleaner device for the cut pieces on substantially the line 5—5 of Figure 2.
Figure 6 is a partially diagrammatic view in top plan of a modified form of apparatus.

Referring to the drawings for a more detailed description, the taffy batch prepared in the manner hereinabove described and which is of relatively bulky form, is fed between suitable forming instrumentalities, such as the pairs of rolls 10, 11, 10', 11', which are spaced slightly above and below a supporting table 12, and serve to compress and elongate the batch into a relatively thin, and, in the present instance flat or sheet-like, body or mass, indicated in broken lines in Figure 3. These forming rolls, which are positively driven in a manner later to be described, are different from rolls heretofore employed, in that the usual forming rolls are comparatively narrow and form a tenuous string-like mass, such as diagrammatically shown in Fig. 6. Both types of forming devices, however, compress and elongate the batch and produce a shape which is relatively thin as compared to the original form of the batch.

From the rolls, the formed batch is introduced into means which will retain the same in its thinned elongated condition and resist any tendency of the same to bulk or puff cross-sectionally. Such means should retain the candy for a sufficient time, ordinarily five to twelve minutes, so as to impart a set to the thin elongated body, and thus minimize subsequent shrinkage and transverse distortion.

A suitable "setting" means is indicated in Figures 1 and 2 and comprises upper and lower series of horizontal rollers 14, 15, supported closely together in a frame 16, and over which pass positively driven endless belts 17, so as to provide means for very slowly conveying the formed mass between the closely arranged series of rollers 14 and 15. The driving means for the belts is hereinafter described. While between the rolls 14, 15 the batch may harden somewhat and so minimize any pulling and longitudinal shrinkage which would otherwise develop following release of the candy by the forming rolls. As will be understood the closely arranged upper rollers 14 and the closely arranged lower rollers 15 form respectively upper and lower walls of a narrow or thin channel therebetween. These walls maintain the mass which has been thinned and elongated between said rollers 10, 10′, 11, 11′, in its thin elongated condition and the slowly travelling belts cause the mass to pass so slowly through the channel that by the time it reaches the exit end thereof, the mass has received a set. Throughout its passage through the channel, the mass becomes somewhat stiff or hardened and is held against any expansion by the walls. The belts constitute devices for causing the mass to travel slowly through the channel and in the present instance fill any slight space which exists between the rollers, the latter serving to reduce any friction between the walls and the belt. After having a set imparted thereto during the relatively slow passage through the narrow space between the rolls 14, 15, the mass passes along a supporting bed 19 arranged between cutting rolls 20, each of which is positively driven and has cutting knives 20′ (Fig. 2) which intersect one another and cut the relatively thin flat mass into individual pieces of substantially regular form. These cutting rolls are driven by means later described, and serve to feed the pieces onwardly beneath an element which engages the cut pieces and separates any that tend to adhere. This element may take the form of a rotating shaft 21 carrying radially disposed brushing element 22. The brush 22 is disposed immediately above an endless conveyor belt 23, which also functions as a means for supporting the cut pieces so that they may be processed, preferably by having applied thereto an agent which will prevent the shrinkage and transverse distortion which tends to develop after the cutting unless the taffy is immediately wrapped.

The treating means comprise a hopper 24 adapted to retain a pulverulent material, such as corn starch, and formed with a perforate bottom 25, through which the material may be freely deposited upon the conveyor belt 23 in the form of a relatively deep bed. The hopper has therein an agitating element 26, which may be positively driven to insure a regular deposit of the starch and a uniformly deep bed thereof. To maintain the desired depth of the starch bed, there are provided side walls 27 above the belt 23, these walls being supported by the uprights 28. The belt 23 travels very slowly so as to retain the pieces within the pulverulent material for a considerable period, such as three or four minutes, and from the belt they are discharged upon a chute 28, which directs the same to a cleaner box 29, having therein a suitable means for removing excess material from the surfaces of the pieces. Although any suitable cleaning means may be used, we prefer a trough 30 pivotally supported at each side by brackets upon pins 31 and having a foraminous bottom 32, immediately above which is disposed a brushing element in the form of a shaft 33 having a spiral brush 34 thereon. The trough has imparted thereto a longitudinal oscillatory movement, as by means of a crank 35 and pitman 36 connected to the trough. The crank is driven from shaft 37, which carries a gear 38 meshing with a bevel gear 39 on a stub shaft which drives a sprocket chain 40 connected with an extension of the brush shaft 33. It will be understood, therefore, that the brush and trough are both operated from shaft 37, which may be directly driven by any suitable means (not shown). The pieces are agitated to remove excess starch by the movement of the trough and are constantly fed lengthwise in the direction of the arrow 41 to the discharge opening 42, through which they pass after having been cleaned in their path of travel by both the brush and the shaking of the trough. After being discharged from the box 29 through opening 43 into a receptacle 44, the pieces are individually lifted by travelling belt 45 having separate compartments 46, for the individual pieces and are then deposited upon a conveyor 47 (Fig. 2), by which they are carried to a suitable coating machine adapted to apply an edible candy like coating of material, such as icing or chocolate.

Excess corn starch removed from the pieces in the trough falls to the bottom 29′ of the box 29, this bottom being sloped toward a spiral conveyor 29″ upon a shaft 30′, which moves the material laterally from the box (Fig. 2) into the lower end of an endless conveyor housing 30″. This housing contains a belt 32′ having flights (Fig. 4) which returns the pulverulent material into the hopper 24, from which it may be again discharged upon the cut pieces of taffy.

The machine described performs the several steps of the method hereinbefore described. The relatively bulky batch is first compressed and elongated to a comparatively thin shape for cutting. In the present instance, this shape is that of a relatively flat sheet-like mass. The mass then has a set imparted thereto as it very slowly passes between the rolls 14, 15, which prevent any transverse distortion from the form created by the former rolls. Thereafter, it is cut into pieces and treated with a suitable agent, which will resist any tendency to shrink longitudinally or become transversely distorted. Following the removal of excess or pulverulent material from the pieces, they are conveyed to the coating apparatus, which need not be described.

The method, as performed by this machine, is characterized, therefore, by (1) a processing of the individual pieces after they are cut and (2) control of the process or pieces so as to provide centers of uniform dimensions. This control in the present instance involves not only the use of the mechanical means in the form of the rolls 14 and 15 before the pieces are cut, but also the application of the cut pieces of a suitable filler material. It will be understood, of course, that the use of the rolls 14 and 15, or of other mechanical means might be dispensed with, and it has been found that if the pieces are treated with a pulverulent, such as corn starch, after they are cut, there will be no appreciable shrinkage, and that the centers, when ready for cutting, have uniform dimensions, and will not shrink after the coating has been applied.

The various parts of the apparatus may be driven in any suitable manner. In Fig. 1 there is shown a motor 50, which, by means of a belt 51 serves to drive a cross shaft 52. This shaft is connected by a sprocket 53 with a shaft 54 mounted in the frame, the shaft 54 being connected by a sprocket 55 with the forming roll 11'. The forming roll 11' is in turn connected by sprocket chain 56 with the first lower forming roller 11. As will be observed, the lower forming rolls are thus positively driven, and in turn serve to form the upper forming rolls 10, 10' through gears 57, Fig. 3.

The lower conveyor belt 17 is driven from shaft 54 which is an extension from the end of the roller 54'; and the roller 54" at the opposite end of the belt is driven through sprocket chain 59 from cross shaft 60 (Fig. 1), which is driven by sprocket 61 from shaft 52. The rolls 62 and 63 for the upper belt are positively driven from the rolls 54, 54' of the lower belt by means of gears 65 (Fig. 3).

The drive for the cutting rolls 20 from the shaft 60 by means of sprocket chain 65' connected to the lower cutting roll, has a shaft extension 66 (Fig. 2) carrying a sprocket traversed by the sprocket 65. The upper cutting roll is driven from the lower cutting roll by gears 69 (Fig. 4).

The conveyor belt 23 is driven from the shaft extension 66 by means of sprocket chain 75 (Fig. 2), which traverses an extension of the roll shaft 76 (Fig. 4). The extension of shaft 76 is connected by means of sprocket chain 77 with the extension 78 of the brush shaft 21, and thereby the brush is driven from the shaft 76.

Further description of the driving means for the various parts is thought unnecessary, and it will be understood that the conveyor 45 may be driven from its lower shaft 45' and that the conveyor 47 may be operated in any suitable manner.

Although we have shown and described a specific driving means for most of the parts of the machine, it will be understood that the various units of the mechanism may be operated in any suitable manner, and that the specific form of driving means is not in any way essential to the invention.

Referring to Figure 6, there is illustrated somewhat diagrammatically a modified form of apparatus for carrying out the same general method. In this form of apparatus, the relatively bulky batch B is fed between positively driven forming rolls adapted to produce a tenuous or string-like relatively thin mass. The forming means may comprise a first pair of rolls 81 arranged on horizontal axes; only the upper roll is shown, but it will be understood a lower roll is disposed beneath a table 80 and directly under the roll 81. A second pair of rolls 82 on vertical axes receives the mass from the rolls 81 and feeds it onwardly onto another pair of rolls 83 disposed on horizontal axes. Arranged behind the rolls 83 are another pair of forming rolls 84, which feed the material to a final pair of horizontal axis rolls 85. These rolls, as will be noted, are all driven and are arranged with the spaces between the successive pairs progressively reduced so that the mass as it leaves the rolls 85 is tenuous in form, and has a relatively small diameter, not exceeding, for example, an inch. The formed and elongated mass is arranged upon the table 80 and gradually fed between a final forming pair of driven forming rolls 86 immediately adjacent a cutter knife 87. The rolls 86 reduce the mass to the precise diameter desired for the individual piece of taffy, and as it leaves the rolls, the mass is cut in individual lengths by the knife 87. The knife 87, which may be mounted upon a shaft 88, is constantly driven and preferably has an arcuate curved cutter edge of symmetry-like form, so that the edge progressively enters the material as the knife is rotated. The string-like body is fed under the knife into compartments 89 of a conveyor 90 which is moved step by step as each length fed therein is cut off, in the direction of arrow 91. This movement is imparted to the conveyor by gear 92 which is given a step by step movement from the single tooth or mutilated gear 93 upon shaft 88. The individual pieces are removed from the conveyor 90 as by means of the rotating brush 94, and deposited in series, as indicated by the reference character S, upon the conveyor 95, which serves to pass the same to the coating machine, and from the latter machine, they pass to the cooler which serves to harden the chocolate.

The parts of this apparatus are driven so that the material will be aged upon the table 80 between the time it leaves the rolls 85 and the time it enters the final forming rolls 86. So that it may receive this ageing, the thin tenuous mass is arranged manually or otherwise, in reverse bends so as to lengthen the path of travel along the table 80 to the rolls 86.

Moreover, after it is cut the centers are moved relatively slowly to the coating machine. As will be observed, each center is carried in an individual compartment 89 of conveyor 90, and the side walls of the compartments may serve to prevent any substantial lateral or horizontal distortion if the material shrinks longitudinally. The distortion is thus regulated or controlled so that any puffing will be in a vertical direction, since the side walls of the compartment resist lateral distention. After leaving the compartments, the material is given a relatively slow movement by a conveyor 95. In other words, the apparatus of Figure 5 is arranged so that the material will be aged between the time it leaves the forming roll 85, and the time it enters the final forming roll 86, and will also be aged further between the time it is cut by knife 87 and the time it enters the coating machine. It is desirable that there be a lapse of two or three minutes upon table 80, and a lapse of preferably at least five minutes between the time the pieces are cut and the time they enter the coating machine. This ageing results in providing center pieces for the coating machine which will not shrink after the application of the coating thereto. Moreover, if such shrinkage as takes place during the ageing is controlled as hereinbefore described, the centers will be of still further improved character. This controlling of the shrinkage may be accomplished not only by the individual compartments 90 of the conveyor 89, which resist lateral distention as longitudinal shrinkage occurs, but also, if desired, a shrinkage resistant material may be deposited upon the pieces, as previously explained.

In utilizing both forms of apparatus and in practicing the method, we have found that the sizing or forming step, and the cutting step should preferably be practiced in an accurately regulated temperature so as to facilitate the control of the shrinkage and puffing, both when applying a treating agent and when imparting to the formed mass a set. For this purpose, the entire apparatus should be disposed in a room, the temperature of which is maintained from 50° to 60° F.

The product produced by this machine need not be illustrated or described further in detail, since it is illustrated in our Patent 1,747,116 granted February 11, 1930.

Although we have described in detail apparatus which may be utilized for carrying out the process and obtaining the product desired, it will be understood that the invention is not limited to the details of construction set forth, and that numerous modifications may be made in both the method and the machine without departing from the invention, the essential characteristics of which are set forth in the following claims.

We claim:

1. A machine for the manufacture of candy of the taffy type comprising means for compressing a relatively bulky batch to thin and elongate the same and for retaining the batch in thinned and elongated condition until it receives a set whereby to control the shrinkage subsequent to compression, means for cutting the compressed batch into individual pieces, and means for applying shrinkage preventing material to surfaces of the cut pieces.

2. A machine for the manufacture of candy of the taffy type comprising means for compressing a relatively bulky batch into a comparatively thin elongated body and for retaining the body in compressed condition until it receives a set whereby to control the shrinkage subsequent to compression, means for cutting the compressed body into individual pieces, and means for applying shrinkage preventing material to surfaces thereof substantially immediately following the cutting.

3. A machine for the manufacture of candy of the taffy type comprising means for compressing a relatively bulky batch into a comparatively thin elongated body, and for retaining the body in compressed condition until it receives a set whereby to control the shrinkage subsequent to compression, means for cutting the compressed body into individual pieces, and means for applying pulverulent shrinkage preventing material to surfaces thereof substantially immediately following the cutting.

4. A machine for the manufacture of candy of the taffy type comprising means for compressing a relatively thick bulky batch into a comparatively thin elongated sheet, means for cutting the elongated sheet into individual pieces, and means for applying pulverulent shrinkage preventing material to the candy for controlling the shrinkage thereof subsequent to the cutting.

5. A machine for the manufacture of candy of the taffy type comprising means for compressing a relatively thick bulky batch into a comparatively thin elongated mass, means for cutting the elongated mass into individual pieces and for controlling the shrinkage thereof subsequent to the cutting by applying to surfaces a pulverulent shrinkage resisting material.

6. In a machine for the manufacture of candy, means for thinning and elongating to the form of a sheet of uniform thickness a relatively bulky batch, and means for receiving the elongated and thinned batch and maintaining the same in its thinned and elongated condition against expansion until it receives a set, said last mentioned means including a moving wall element for conveying the sheet.

7. In a machine for the manufacture of candy, means for thinning and elongating to sheet form a relatively bulky batch, means for receiving the elongated and thinned batch and maintaining the same in its thinned and elongated condition against expansion until it receives a set, means for cutting the set mass into individual pieces, and means for feeding the sheet to the cutting instrumentality while it is receiving a set.

8. In a machine for the manufacture of candy, a plurality of feeding rollers adapted to feed and reduce a relatively bulky batch into a thinned and elongated sheet, and means for receiving the thinned and elongated body from the feeding rollers and for maintaining the same in thinned and elongated condition until it receives a set, said last-mentioned means comprising opposed walls forming a receiving channel therebetween and traveling means for conveying the sheet between said walls.

9. In a machine for the manufacture of candy, a plurality of feeding rollers adapted to feed and reduce a relatively bulky batch into a thinned and elongated sheet, means for receiving the thinned and elongated body from the feeding rollers and for maintaining the same in thinned and elongated condition until it receives a set, said last-mentioned means comprising opposed walls forming a receiving channel therebetween and traveling facing belts for causing movement of the thinned elongated mass through said channel.

10. In a machine for the manufacture of candy, a plurality of feeding rollers adapted to feed and reduce a relatively bulky batch into a thinned and elongated sheet, means for receiving the thinned and elongated body from the feeding rollers and for maintaining the same in thinned and elongated condition until it receives a set, said last-mentioned means comprising opposed walls forming a receiving channel therebetween and devices for causing movement of the thinned elongated mass through said channel, and cutting means at one end of said channel for progressively dividing said set mass into individual pieces as it leaves the channel.

11. In a machine for the manufacture of candy, a plurality of feeding rollers adapted to feed and reduce a relatively bulky batch into a thinned and elongated body, means for receiving the thinned and elongated body from the feeding rollers and for maintaining the same in thinned and elongated condition until it receives a set, said last-mentioned means comprising opposed walls forming a receiving channel therebetween and travelling belts overlying said walls for causing movement of the thinned elongated mass therebetween and through said channel from one end to the other.

12. In a machine for the manufacture of candy, a plurality of feeding rollers adapted to feed and reduce a relatively bulky batch into a thinned and elongated body, means for receiving the thinned and elongated body from the feeding rollers and for maintaining the same in thinned and elongated condition until it receives a set, said last-mentioned means comprising opposed walls forming a receiving channel therebetween, travelling belts overlying said walls for causing movement of the thinned elongated mass therebetween and through said channel from one end to the other, and a cutting instrumentality disposed at one end of said channel for receiving the set mass therefrom and dividing the same into individual pieces.

In testimony whereof we have hereunto set our hands.

LEE G. JAMES.
HARRY E. JAMES.
ENOCH R. JAMES.